US006579103B2

(12) United States Patent
Araki

(10) Patent No.: US 6,579,103 B2
(45) Date of Patent: Jun. 17, 2003

(54) ROLLER CONNECTOR MOUNTED ON STEERING DEVICE

(75) Inventor: Shunji Araki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 115 days.

(21) Appl. No.: 09/851,842

(22) Filed: May 9, 2001

(65) Prior Publication Data

US 2001/0040088 A1 Nov. 15, 2001

(30) Foreign Application Priority Data

May 12, 2000 (JP) ....................................... 2000-144605

(51) Int. Cl.[7] ................................................... B60L 1/00
(52) U.S. Cl. ....................................... 439/15; 200/61.54
(58) Field of Search ......................... 200/61.54; 439/15, 439/164

(56) References Cited

U.S. PATENT DOCUMENTS 5,936,215 A 8/1999 Masuda et al.
6,246,128 B1 * 6/2001 Sugata ................ 200/61.54 X

* cited by examiner

*Primary Examiner*—Renee Luebke
(74) *Attorney, Agent, or Firm*—Brinks Hofer Gilson & Lione

(57) ABSTRACT

In a conventional roller connector, when a spoke member of a steering device hits against an electrical lead-through section of a movable housing, there occurs a knocking sound, which will be unpleasant to the driver. The present invention, therefore, provides a roller connector which will not produce the knocking sound. Flexible cables are connected at least at one end to the electrical lead-through section of a movable housing. An elastic member is projectingly disposed on a surface of the upper wall where the electrical lead-through section protrudes, thus being driven to turn the movable housing.

19 Claims, 9 Drawing Sheets

ROLLER CONNECTOR MOUNTED ON STEERING DEVICE

BACKGROUND OF THE INVENTION

1. Field of the Invention

The present invention relates to a roller connector which is mounted on a steering device of an automobile and used as a means for electrical connection between such electrical devices as the steering device and an air-bag system provided in the vehicle body.

2. Description of Related Art

There has been proposed a roller connector for electrical connection between an electric device mounted on a steering device and an electrical device provided in the vehicle body.

The roller connector enables electrical connection between an electrical device mounted on the steering wheel which is a rotating body, and an electrical device mounted in the vehicle body which is a fixed body. Between the rotor section (movable housing) which is actuated to turn by the steering wheel and a case constituting the stator section (fixed housing) is housed, in a wound state, a flexible electrical cable or an optical fiber cable (hereinafter these cables are generally called the "flexible cables"). The cable is secured at one end to the rotor section and at the other end to the stator section, thereby enabling electrical connection between the electrical devices by utilizing winding and unwinding of the flexible cable.

Referring to the accompanying drawings, a conventional roller connector will be explained.

FIG. 14 is a plan view showing the conventional roller connector. FIG. 15 is a side plan view showing the conventional roller connector. FIG. 16 is a plan view for explaining the conventional roller connector. And FIG. 17 is a sectional view taken along line 17—17 of FIG. 14.

A roller connector 100, as shown in FIG. 16, is comprised roughly of a fixed housing 101, a movable housing 102 rotatably connected to the fixed housing 101, first and second flat cables 103 and 104 which are flexible cables housed between the fixed and movable housings 101 and 102, and a moving body 105 rotatably disposed between the fixed and movable housings 101 and 102.

The fixed housing 101 is provided with a cylindrical outer cylinder portion 108, an annular bottom wall 107 provided at the end of the outer cylinder portion 108, and a round hole 107*a* (shown in FIG. 17) provided at the central part of the bottom wall 107. On the other hand, the movable housing 102 is provided with a cylindrical inner cylinder portion 109 and an approximately annular upper wall 106 located on one end of the inner cylinder portion 109. The outer cylinder portion 108 and the inner cylinder portion 109 are arranged coaxially, defining an annular housing section 110 between the outer and inner cylinders 108 and 109.

Inside of the housing section 110 is disposed the moving body 105, which has a ring-shaped rotating plate 111, a cluster of a plurality of rollers 112 pivotally supported on the rotating plate 111, and a circular hole, and is comprised of a pair of cylindrical fixed columns 113. The pair of fixed columns 113 is formed integrally with the rotating plate 111. Between one of the pair of fixed columns 113 and the rollers 112 is formed a first opening portion 114 through which the first flat cable 103 is inserted; and between the other of the pair of fixed columns 113 and the rollers 112 is formed a second opening 115 through which the second flat cable 104 is inserted.

The first and second flat cables 103 and 104 are belt-like cables each having a plurality of conductors, such as copper (Cu), extended on one side of a base film made of an insulating tape. The first flat cable 103 is indicated in black and the second flat cable 104, in white, for the sake of convenience. The outer ends of the first and second flat cables 103 and 104 are connected to the joint portion 116 on the fixed side which is fixed to the outer cylinder portion 108, being electrically led out of the fixed housing 101 through the joint portion 116 on the fixed side.

The inner ends of the first and second flat cables 103 and 104 are connected to the joint portion 117 on the movable housing 102, which is fixed to the inner cylinder portion 109, and are electrically led out of the movable housing 102 through the movable joint portion 117.

The roller connector 100 of the above-described constitution is used as a means for electrical connection of vehicle-mounted air-bag system and horn circuit by fixedly attaching the fixed housing 101 to the vehicle body (not shown) or the movable housing 102 to a steering wheel member (not shown), and also by connecting both ends of the first and second flat cables 103 and 104 to electrical devices on both the vehicle body side and the steering wheel side through the fixed and movable joint portions 116 and 117.

Next, the fixed housing 101 and the movable housing 102 of the conventional connector 100 will be explained in detail.

The fixed housing 101, as shown in FIG. 17, is made of a synthetic resin material and formed by a molding process. On the housing 101 are formed the cylindrical outer cylinder portion 108, and an approximately annular bottom wall 107 which intersects the axis of the outer cylinder portion 108 and located on one end side of the outer cylinder portion 108. At the central part of the bottom wall 107 is formed a round hole 107*a.*

At a specific part of the outer edge portion of the bottom wall 107 are provided a plurality (e.g., four) mounting portions 107*b* protruding outwardly. The mounting portions 107*b* are provided with holes 107*c.*

On the other hand the movable housing 102 is made of a synthetic resin material and formed by a molding process. The approximately annular upper wall 106, the cylindrical inner cylinder 109 projecting out to meet the upper wall 106 at right angles, and an electrical lead-through section 118 projecting out on the opposite side of the inner cylinder portion 109 in the vicinity of the outer peripheral portion of the upper wall 106 are formed in one body.

The circular hole at the central part of the inner cylinder 109 includes a large-diameter hole 109*a* on one end side and a small-diameter hole 109*b* on the other end side which is smaller in diameter than the large-diameter hole 109*a.*

The electrical lead-through section 118 of the upper wall 106, surrounded with an approximately semicircular side wall, is integrally formed into a cylindrical form, and has a first side wall 118*a* of a flat shape formed on the axis side of the movable housing 102, a second side wall 118*b* of a curved shape opposite to the first sidewall 118*a,* and a pair of third side walls 118*c,* 118*c* (shown in FIG. 14) of a circular shape in opposite positions connecting the first and second side walls 118*a* and 118*b*. The surface of the second side wall 118*b* of the curved shape is formed into a shape along the outer peripheral edge of the upper wall 106 of the movable housing 102.

In the area (section) surrounded by the first, second and third side walls 118*a,* 118*b* and 118*c* are arranged a plurality of (e.g., five) terminals 119 made of an electrically conductive material and a plurality of (e.g., four) leads 120 (shown in FIG. 14). The leads 120 are extended (led) out of the electrical lead-through section 118 of the movable housing 102. The terminal 119 and the lead 120 are electrically connected by an appropriate means to the first and second flat cables 103 and 104 through the movable joint portion 117.

The terminal 119 is configured as a so-called connector portion.

The inner cylinder portion 109 of the movable housing 102 is arranged with the inner cylinder 109 inserted in the hole 107*a* formed in the fixed housing 101, thereby forming both the movable housing 102 and the fixed housing 101 into one body.

Next, the structure for mounting the roller connector 100 to the steering device will be explained.

FIG. 18 is a plan view explaining the mounting the conventional roller connector to the steering device.

The steering device, as shown in FIG. 18, is comprised mainly of a steering wheel member 121, a steering column member 127, a steering shaft 129, and the roller connector 100.

The steering wheel member 121 has an annular rim portion 122 and a plurality of (e.g., four spaced at 90-degree intervals) spoke members 123 radially arranged; the rim portion 122 being supported at one end with a space section provided at the center. Also provided is an approximately rectangular holding portion 124 for holding the other end of each of the spoke members 123.

The rim portion 122 is formed by molding or cutting a synthetic resin material or a wood material. The spoke member 123 is made of a metallic material, being formed into one body through a pressing or cutting process.

On the column member 127 is placed the bottom wall 107 of the fixed housing 101 of the roller connector 100, which is secured to the column member 127.

The steering shaft 129 is installed through the column member 127, the inner cylinder portion 109 of the roller connector 100, and the holding portion 124 of the steering wheel member 121; then the steering wheel member 121 and the steering shaft 129 are fixedly locked by a nut 130.

In this state, the electrical lead-through section 118 of the roller connector 100 is projectingly disposed in the space section of the steering wheel member 121 from between a pair of adjacent spoke members 123 of the steering wheel member 121; and a pair of the third side walls 118*c*, 118*c* of the electrical lead-through section 118 are located adjacently to, or in contact with, each spoke member 123. In other words, the electrical lead-through section 118 is disposed like directly held in between the pair of spoke members 123.

Next, operation of the conventional steering device will be described.

First, when the rim portion 122 of the steering wheel member 121 is turned for example clockwise (in the direction of the arrow A), each spoke member 123 is turned by the rotation of the rim portion 122. Then, with the rotation of the spoke member 123, the electrical lead-through section 118 of the roller connector 100 directly held in the pair of spoke members 123 is turned together.

With the rotary motion of the electrical lead-through section 118, the movable housing 102 of the roller connector 100 turns together.

That is, with the rotation of the rim portion 122, the movable housing 102 of the roller connector 100 turns clockwise by a predetermined number of turns.

On the other hand, the fixed housing 101 of the roller connector 100, being secured on the column member 127, is held in the secured status.

When the rim portion 122 is turned for example in the counterclockwise direction, the electrical lead-through section 118 of the roller connector 100 directly held between the pair of spoke members 123 is also turned together with nearly the same operation as stated above, thus causing the movable housing 102 of the roller connector 100 to turn counterclockwise by the predetermined number of turns.

In the steering device using the roller connector 100 of the above-described constitution, however, when the rim portion 122 is turned clockwise or counterclockwise, the electrical lead-through section 118 directly held between the spoke members 123 is turned together. At this time, the spoke member 123 made of a metallic material collides against the electrical lead-through section 118 made of a synthetic resin material, which, therefore, is pushed to turn after bumping against the electrical lead-through section 118.

Therefore, there occurs a knocking sound, which is annoying to the driver, when the spoke member 123 collides against the electrical lead-through section 118.

SUMMARY OF THE INVENTION

In view of these and other problems associated with the prior art, an object of the present invention is the provision of a roller connector which will not produce a knocking sound if the electrical lead-through section 118 of the roller connector 100 collides against the spoke member 123 of the steering wheel member 121 during the operation of the steering device.

The roller connector of the present invention is comprised of a fixed housing, a movable housing having an upper wall and an electrical lead-through section projecting out of the upper wall and rotatably mounted in the fixed housing, and a flexible cable housed in a space formed between the fixed housing and the movable housing. The flexible cable at least one end of is connected to the electrical lead-through section of the movable housing at the other end of the housing. Disposed adjacently to the electrical lead-through section of the upper wall is an elastic member, to thereby turn the movable housing by applying a driving force to the elastic member. Thanks to this configuration, therefore, the roller connector has such an advantage that a knocking sound will be absorbed by the elastic member even when the spoke member made of a metallic material knocks against the elastic member, thus producing no knocking sound.

The roller connector of the present invention is provided with a fixing post on the upper wall to thereby lock the elastic member, and therefore has the advantage that the elastic member can be reliably fixed.

Furthermore, in the roller connector of the present invention, the elastic member is locked on a side wall of the electrical lead-through section. Because of this configuration, it is possible to provide a low-cost roller connector which allows the mounting of the elastic member to the electrical lead-through section by a simple structure.

The roller connector of the present invention has a fixing post formed adjacently to the electrical lead-through section on the upper wall. The elastic member is locked to the fixing post and the electrical lead-through section. Because of this configuration, the elastic member is securely held by the above-described two members, enabling to keep stabilized arrangement of the elastic member for a prolonged period of time.

Furthermore, the roller connector of the present invention has, on the upper wall, a plurality of fixing posts formed, on which the elastic member is locked; because of this configuration, the elastic member is locked more reliably by these two fixing members.

Furthermore, the roller connector of the present invention is designed such that the elastic member is driven by the spoke member of the steering wheel member. Because of this configuration, it is unnecessary to separately form an elastic member driving member on the steering wheel member. Therefore a conventional spoke member is usable, thus enabling the provision of a steering device using the roller connector that is driven by a low-cost steering wheel member.

DESCRIPTION OF THE PREFERRED EMBODIMENTS

A roller connector of the present invention will be described in detail with reference to the accompanying drawings.

Figure 1:
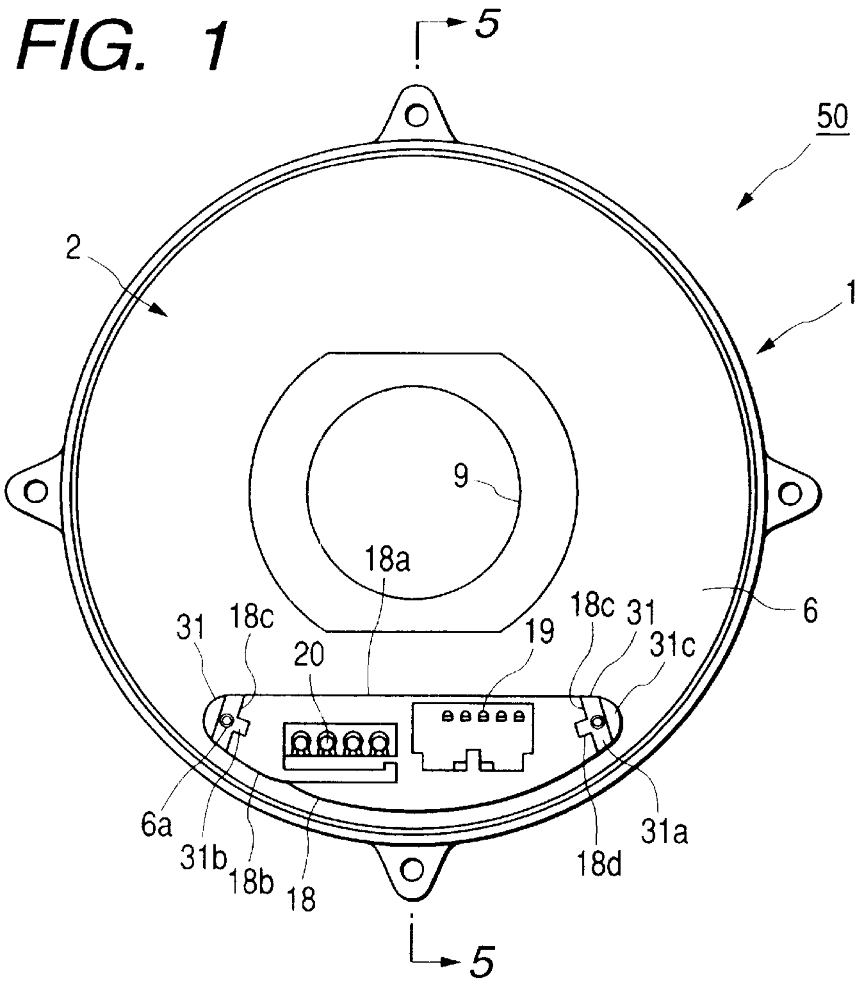
FIG. 1 is a plan view showing a roller connector according to the embodiment of the present invention.
Figure 2:
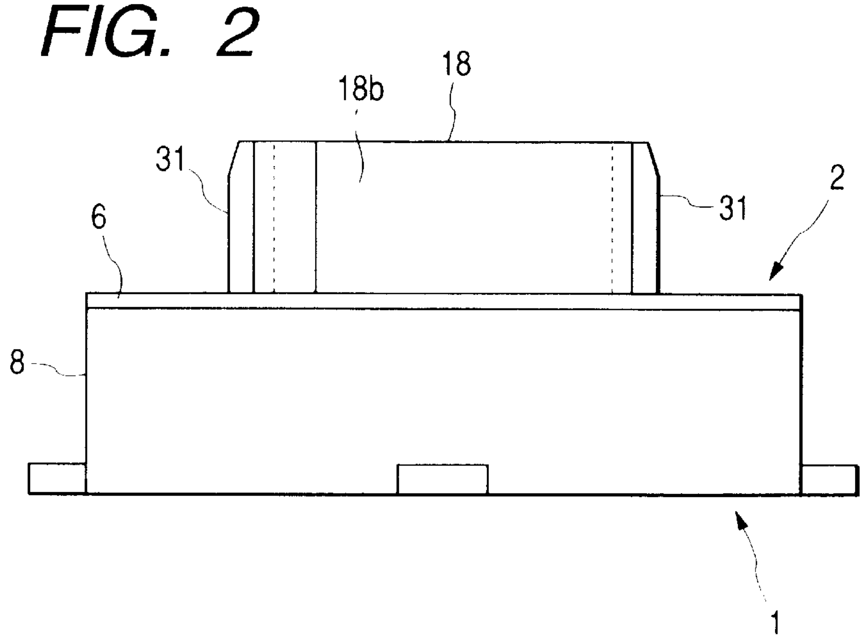
FIG. 2 is a side view showing the roller connector according to the embodiment of the present invention.
Figure 3:
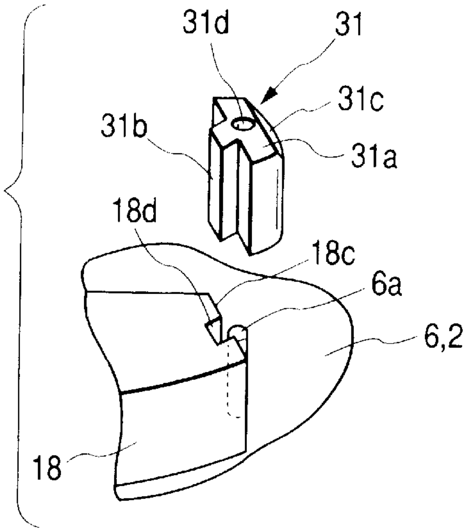
FIG. 3 is a perspective view showing an elastic member of the roller connector according to the embodiment of the present invention.
Figure 4:
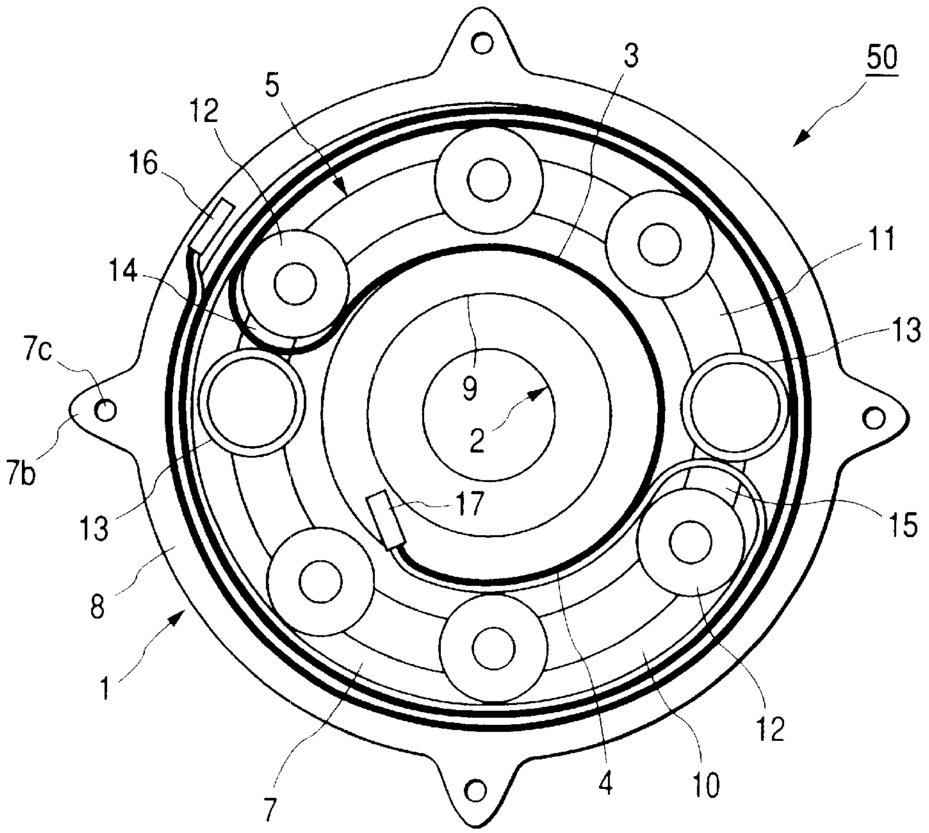
FIG. 4 is a plan view for explaining the roller connector of the present invention.
Figure 5:
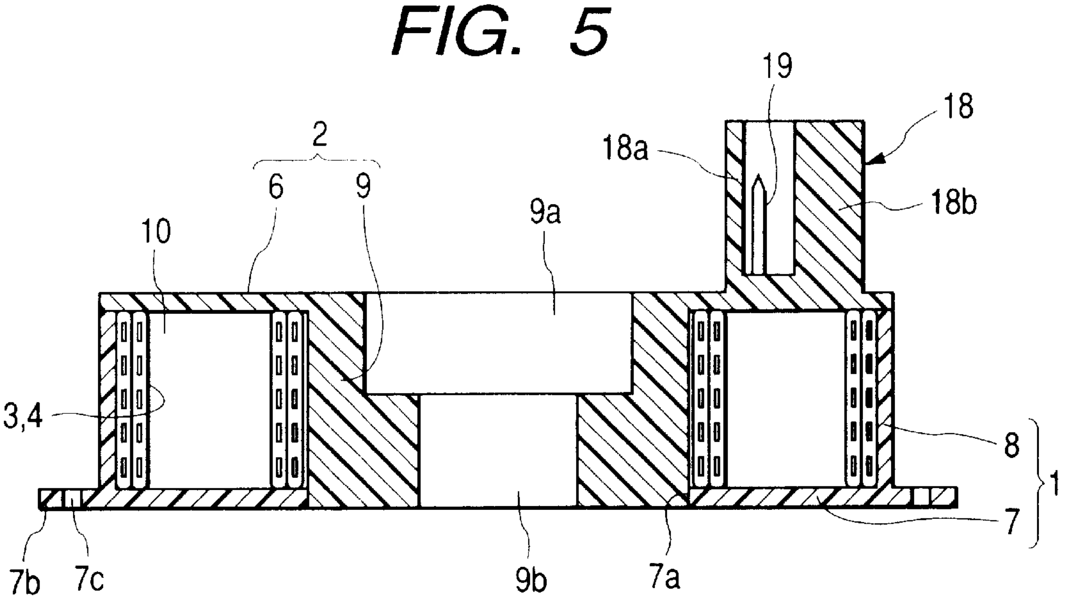
FIG. 5 is a sectional view taken along line 5—5 of FIG. 1.

FIG. 1 is a plan view showing the embodiment of a roller connector of the present invention. FIG. 2 is a side view showing the roller connector according to the embodiment of the present invention. FIG. 3 is a perspective view showing an elastic member of the roller connector according to the embodiment of the present invention. FIG. 4 is a plan view for explaining the roller connector of the present invention. FIG. 5 is a sectional view taken along line 5—5 of FIG. 1.

As shown in FIG. 4, the roller connector 50 is comprised roughly of a fixed housing 1, a movable housing 2 rotatably connected to the fixed housing 1, first and second flat cables 3 and 4 which are flexible cables housed between the fixed and movable housings land 2, and a moving body 5 rotatably disposed between the fixed and movable housings 1 and 2.

The fixed housing 1 is provided with a cylindrical outer cylinder portion 8, a circular bottom wall 7 formed at the end of the outer cylinder portion 8, and a round hole 7*a* (shown in FIG. 5) provided at the center of the bottom wall 7. On the other hand, the movable housing 2 is provided with a cylindrical inner cylinder portion 9, and an approximately annular upper wall 6 provided at one end of the inner cylinder portion 9. The outer cylinder portion 8 and the inner cylinder portion 9 are coaxially arranged. Between the outer and inner cylinder portions 8 and 9 is defined an annular housing section 10.

In the housing section 10 is disposed the moving body 5, which has a ring-shaped rotating plate 11, a cluster of a plurality of rollers 12 pivotally supported on the rotating plate 11, and a round hollow hole, and is comprised of a pair of cylindrical fixing posts 13. The pair of fixing posts 13 are formed integral with the rotating plate 11. Between one of the fixing posts 13 and the rollers 12 is formed a first opening portion 14 for the insertion of the first flat cable 3; and between the other fixing post 13 and the roller 12 is formed a second opening portion 15 for the insertion of the second flat cable 4.

The first and second flat cables 3 and 4 are belt-like bodies formed by extending a plurality of conductors, such as copper (Cu), on one side of a base film made of an insulated tape of polyethylene terephthalate (PET). For the sake of convenience, the first flat cable 3 is indicated in black, while the second flat cable 4, in white. The outer ends of the first and second flat cables 3 and 4 are connected to the fixed-side joint portion 16 secured to the outer cylinder portion 8, being thereby electrically led out of the fixed housing 1 through the fixed-side joint portion 16.

The inner ends of the first and second flat cables 3 and 4 are connected to a movable joint portion 17 which is secured to the inner cylinder portion 9, thus being electrically led out of the movable housing 2 through the movable joint portion 17.

At this time, the first and second flat cables 3 and 4 are arranged as follows: the first flat cable 3 and the second flat cable 4 starting at the fixed-side joint portion 16, are branched off after being wound counterclockwise along the inner wall of the outer cylinder portion 8; then the first flat cable 3, after passing the first opening portion 14, is reversed in a U form on one of the rollers 12; and the second flat cable 4, after passing the second opening 15, is reversed in a U form on one of the rollers 12. Furthermore, the first flat cable 3 is wound clockwise around the inner cylinder portion 9, with the second flat cable 4 routed on the outer side of the first flat cable 3 in this area, being housed in the housing section 10 to finally reach the movable joint portion 17.

The roller connector 50 configured as schematically shown above is used as a means for electrical connection of the vehicle-mounted air-bag system and the horn circuit by fixing the fixed housing 1 to the vehicle body (not shown) and the movable housing 2 to the steering wheel member (not shown) and also by connecting both ends of the first and second flat cables 3 and 4 to electrical devices on both the vehicle body and the steering wheel sides through the fixed and movable joint portions 16 and 17.

Next, the fixed housing 1 and the movable housing 2 of the roller connector 50 according to the present invention will be explained in detail.

As shown in FIG. 5, the fixed housing 1 made of a synthetic resin material is formed by a molding process, and is provided with the cylindrical outer cylinder portion 8 and an approximately annular bottom wall 7 which intersects the axis of the outer cylinder portion 8 and is formed on one end side of the outer cylinder portion 8. At the center of the bottom wall 7 is formed the round hole 7*a*.

The movable housing 2 made of a synthetic resin material is formed by a molding process, and has the cylindrical inner cylinder portion 9 and the approximately annular upper wall 6 which intersects the axis of the inner cylinder portion 9 and disposed at one end side of the inner cylinder portion 9.

The hole formed at the center of the inner cylinder portion 9 includes a large-diameter hole 9*a* on one end side and a small-diameter hole 9*b* on the other end side which is smaller in diameter than the large-diameter hole 9*a*.

On a part of the upper wall 6, near the outer peripheral edge, is formed an electrical lead-through section 18 which projects outwardly.

The inner cylinder 9 of the movable housing 2 is mounted with the inner cylinder portion 9 inserted in the hole 7*a* of the fixed housing 1, so that the movable housing 2 and the fixed housing 1 may be formed in one body. In this state mentioned above, the outer peripheral portion of the upper wall 6 of the movable housing 2 is disposed on the outer cylinder portion 8 of the fixed housing 1.

The electrical lead-through section 18 of the upper wall 6 is, as shown in FIG. 1, surrounded by a side wall having an approximately dome-shaped cross section and formed integrally in an approximately cylindrical shape, and is provided with a flat first side wall 18*a* formed on the axis side of the movable housing 2, a curved second side wall 18*b* on the opposite side of the first side wall 18*a*, and a pair of opposite flat third side walls 18*c*, 18*c* connecting the first and second side walls 18*a* and 18*b*. The surface of the curved second side wall 18*b* is formed along the outer peripheral edge of the upper wall 6 of the movable housing 2.

The pair of third side walls 18*c*, 18*c* are formed at a specific angle (e.g., about 100 degrees) in relation to the first side wall 18*a*; then, the third side wall 18*c* is provided with a rectangular groove portion 18*d* formed vertically to the upper wall 6, in the entire surface of the third side wall 18*c*.

That is, the electrical lead-through section 18 is surrounded on the four sides by the first, second and third side walls 18*a*, 18*b*, 18*c*, 18*c*.

In the area (section) surrounded by the first, second and third side walls 18*a*, 18*b*, 18*c* are arranged a plurality of (e.g., five) terminals 19 made of a conductive metallic material and a plurality of (e.g., four) leads 20. The leads 20 are extended (led) outwardly of the electrical lead-through section 18 of the movable housing 2. The terminal 19 and the lead 20 are electrically connected by an appropriate means to the first and second flat cables 3 and 4 through the movable joint portion 17. The terminal 19 is formed as a so-called connector portion.

On the upper wall 6, near each of the side walls 18*c* of the electrical lead-through section 18 is provided a cylindrical post 6*a* (shown in FIG. 3) as a fixing post protruding out of the upper wall 6 in parallel with the groove portion 18*d*.

As shown in FIG. 3, the elastic member 31 is made of a elastic material such as rubber and formed by a molding process, and has a semi-cylindrical base portion 31*a*, a rectangular key portion 31*b* projecting out of the flat surface side of the base portion 31*a*, and a taper portion 31*c* formed at one end portion on the curved surface side of the base portion 31*a*. Nearly at the center of the base portion 31*a* is formed a round through hole 31*d*.

The elastic member 31 is of such a structure that when the key portion 31*b* is inserted into the groove portion 18*d* while inserting the post 6*a* into the through hole 31*d* of the elastic member 31, the post 6*a* of the upper wall 6 is inserted into the through hole 31*d* and the key portion 31*b* enters the groove portion 18*d* of the third side wall 18*c*. That is, the elastic member 31 is fixed on the post 6*a* and locked on the third side wall 18*c* of the electrical lead-through section 18, thereby forming the electrical lead-through section 18 and the elastic member 31 into one body.

Next, the structure of mounting the roller connector 50 to the steering device will be explained.

Figure 6:
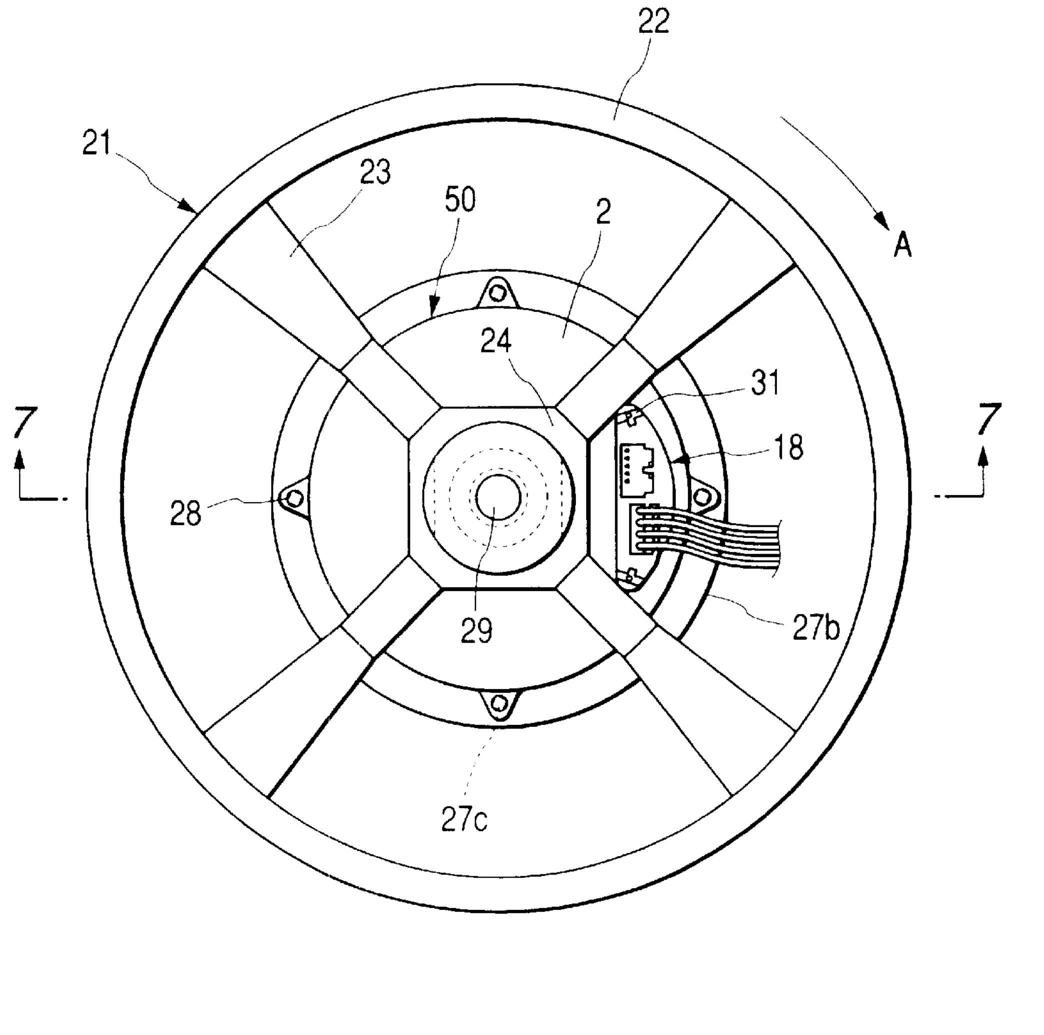
FIG. 6 is a plan view for explaining the mounting of the roller connector of the present invention to a steering device.
Figure 7:
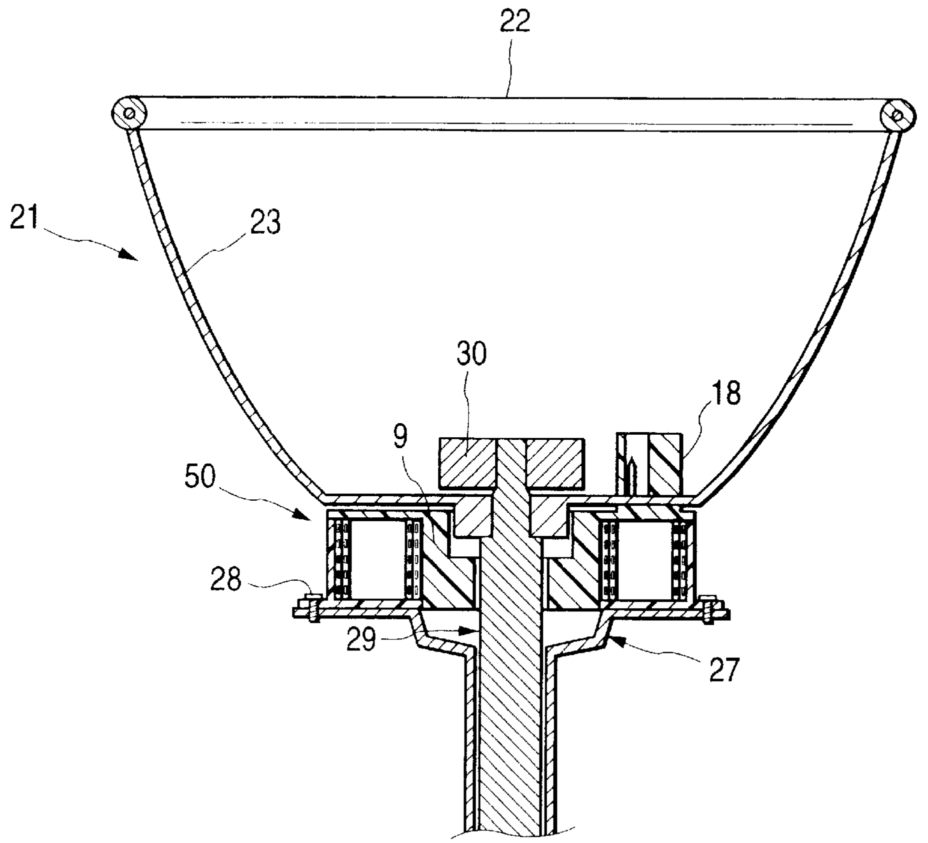
FIG. 7 is a sectional view taken along line 7—7 of FIG. 6.
Figure 8:
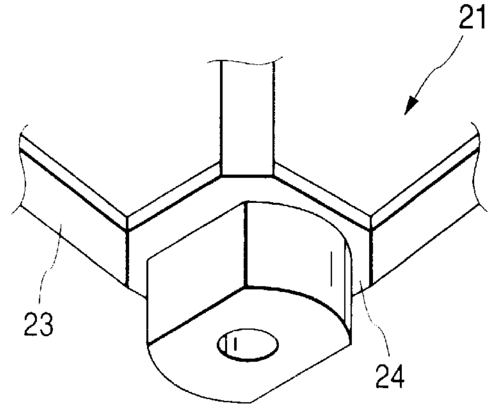
FIG. 8 is an explanatory view for explaining the steering wheel member of the steering device of the present invention.

FIG. 6 is a plan view explaining the mounting of the roller connector of the present invention to the steering device. FIG. 7 is a sectional view taken along line 7—7 of FIG. 6. And FIG. 8 is an explanatory view for explaining the steering wheel member of the steering device of the present invention.

The steering device, as shown in FIG. 7, is comprised mainly of a steering wheel member 21, a steering column member 27, a steering shaft 29, and the roller connector 50.

The steering wheel member 21 has an annular rim portion 22, a plurality of (e.g., four arranged at 90-degree intervals) spoke members 23 arranged radially in a circular form, supporting the rim portion 22 at one end and having a space section at center, and an approximately rectangular holding portion 24 for holding the other end of each spoke member 23.

The rim portion 22 is made of a synthetic resin material or a wooden material for example and formed by a molding or cutting process. The spoke member 23, the holding portion 24, and the hub member 25 are made of a metallic material and formed in one body by pressing or cutting.

On the column member 27 is mounted the bottom wall 7 of the fixed housing 1 or the roller connector 50; and the roller connector 50 is fixedly attached on the column member 27.

The steering shaft 29 is mounted through the column member 27, the inner cylinder 9 of the roller connector 50, and the holding portion 24 of the steering wheel member 21, and the steering wheel member 21 and the steering shaft 19 are securely locked by a nut 30.

In this state, the electrical lead-through section 18 and the elastic member 31 of the roller connector 50 are disposed protruding out into the space section of the steering wheel member 21 from between the pair of adjacent spoke members 23 of the steering wheel member 21. The base portion 31*a* of the elastic member 31 made of an elastic material is disposed adjacently, or in contact with, each spoke member 23. In other words, the elastic member 31 disposed in the electrical lead-through section 18 is directly held between the pair of spoke members 23.

Next, operation of the steering device according to the present invention will be explained.

First, when the rim portion 22 of the steering wheel member 21 is turned clockwise (in the direction of the arrow A) for example, each spoke member 23 is turned by the rotation of the rim portion 22. Then, when the spoke member 23 is turned, the elastic member 31 located in the electrical lead-through section 18 of the roller connector 50 directly held between a pair of spoke members 23 is turned together.

In this state, the elastic member 31 located between the spoke members 23 is locked to the third side walls 18*c*, 18*c* formed at a specific angle (e.g., about 100 degrees) in relation to the first side wall 18*a* of the electrical lead-through section 18. Therefore, the turning force (pressure) of the spoke members 23 which are radially arranged is reliably transmitted with stability to the electrical lead-through section through the elastic member 31.

When the turning force is applied to the elastic member 31 disposed in the electrical lead-through section 18, the movable housing 2 of the roller connector 50 is turned together. With the rotation of the rim portion 22, the movable housing 2 of the roller connector 50 is turned clockwise by a specific number of turns. That is, the elastic member 31 is driven to turn the movable housing 2.

On the other hand, the fixed housing 1 of the roller connector 50, being secured on the column member 27, is held in an as-fixed status.

Next, when the rim portion 22 is turned for example counterclockwise, the elastic member 31 disposed in the electrical lead-through section 18 of the roller connector 50 held directly between the pair of spoke members 23 is turned together by nearly the same operation as described above. Thus the movable housing 2 of the roller connector 50 will be turned counterclockwise by the specific number of turns.

Next, referring to the accompanying drawings, the second embodiment of the roller connector according to the present invention will be explained.

Figure 9:
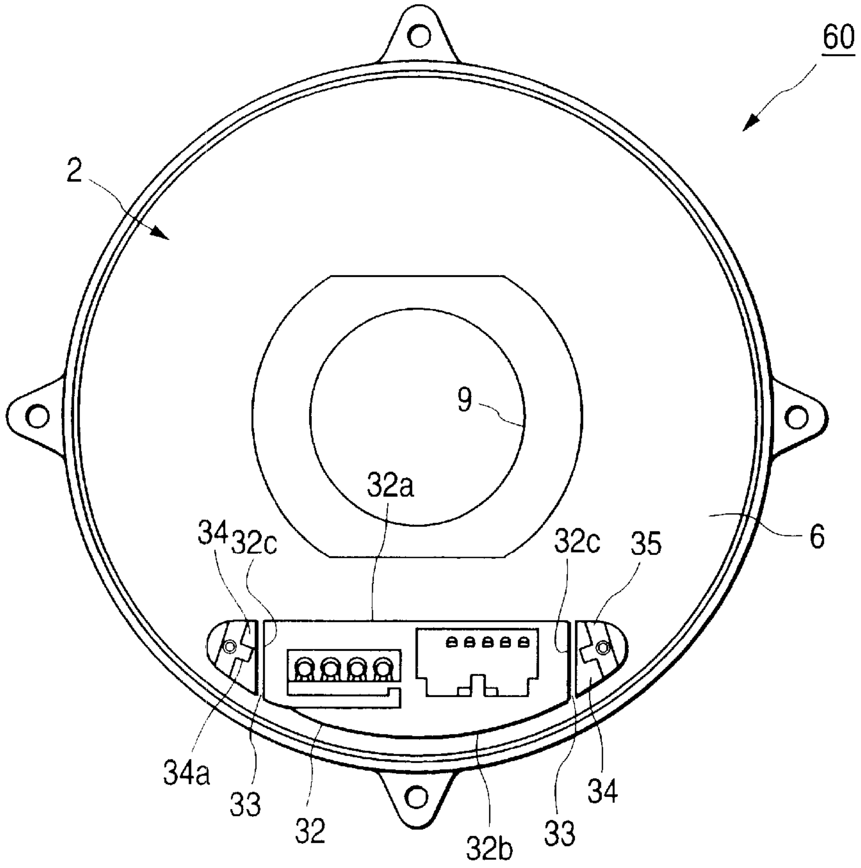
FIG. 9 is a plan view showing a second embodiment of the roller connector of the present invention.
Figure 10:
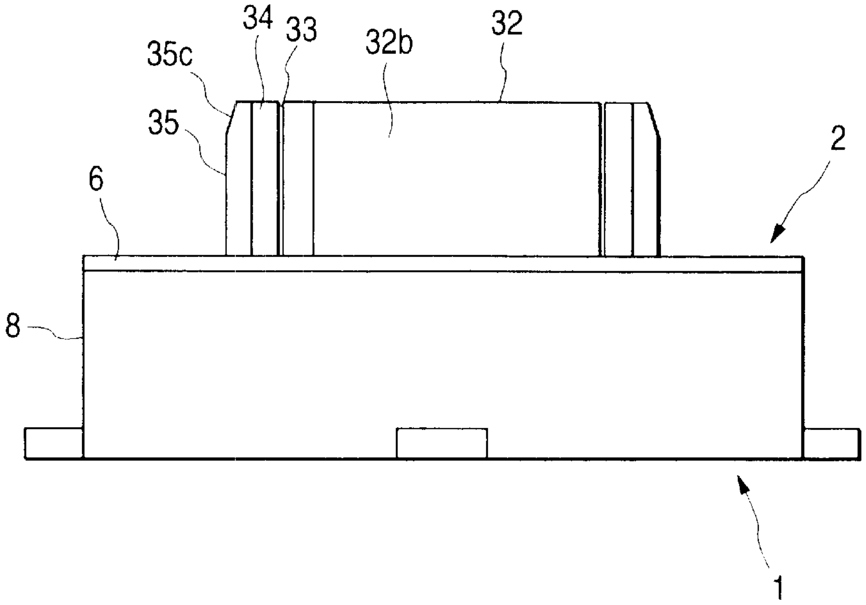
FIG. 10 is a side view showing the second embodiment of the roller connector of the present invention.
Figure 11:
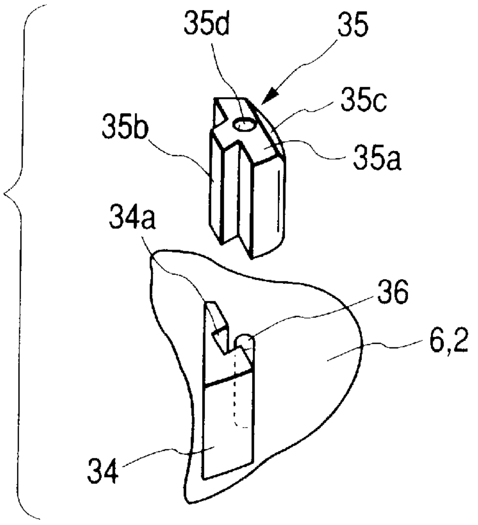
FIG. 11 is a perspective view showing the second embodiment of an elastic member of the roller connector of the present invention.

FIG. 9 is a plan view showing the second embodiment of the roller connector according to the present invention. FIG. 10 is a side view showing the second embodiment of the roller connector according to the present invention. FIG. 11 is a perspective view showing the second embodiment of the elastic member of the roller connector according to the present invention.

The inner configuration of the roller connector is the same as that of the roller connector of the first embodiment described above and therefore will not be explained.

Described below are differences in the configuration of the roller connector of the second embodiment from that of the first embodiment.

As shown in FIG. 9, provided in a part near the outer peripheral edge of the upper wall 6 of the movable housing 2 are an electrical lead-through section 32 projecting outwardly, a triangular post 34 projecting in the vicinity of, and in parallel with, the electrical lead-through section 32 via a slight gap portion 33 from the electrical lead-through section 32, and a cylindrical post 36 projecting in the vicinity of the triangular post 34. At this time, the triangular post 34 and the post 36 are provided as fixing posts respectively. The triangular post 34 has, on one side facing the post 36, a rectangular groove portion 34*a* formed vertically to the upper wall 6 along the entire height of the one side mentioned above.

The electrical lead-through section 32 of the upper wall 6, as shown in FIG. 9, is formed in an approximately cylindrical one body surrounded by a side wall of approximately dome-shaped cross section which includes a flat first side wall 32*a* formed on the axis side of the movable housing 2, a curved second side wall 32*b* on the opposite side of the first side wall 32*a*, and a pair of flat third side walls 32*c*, 32*c* oppositely positioned to connect the first and second side walls 32*a* and 32*b*. The curved surface of the second side wall 32*b* is formed to a shape along the outer peripheral edge of the upper wall 6 of the movable housing 2. The pair of third side walls 32*c*, 32*c* are formed to intersect the first side wall 32*a* at right angles.

As shown in FIG. 11, the elastic member 35 is made of an elastic material such as rubber and formed by a molding process. It has a semi-cylindrical base portion 35*a*, a rectangular key portion 35*b* projecting outwardly from the flat surface side of the base portion 35*a*, and a taper portion 35*c* formed on one end portion of the curved surface side of the base portion 35*a*. Nearly at the center of the base portion 35*a* is formed a round through hole 35*d*.

The elastic member 35 is of such a configuration that when the key portion 35*b* is inserted into the groove portion 34*a* of the triangle post 34 simultaneously while inserting the post 36 into the through hole 35*d* of the elastic member 35, the through hole 35*d* is inserted over the post 36 of the upper wall 6 and the key portion 35*b* is disposed in the groove portion 34*a* of the triangular post 34 as a fixing post. The triangular post 34 and the elastic member 35, therefore, are assembled into one body; and the elastic member 35 and the electrical lead-through section 18 are separated by a gap portion 33. In this status, the post 36 can function as a post for fixing the elastic member 35.

Next, in the structure for mounting the roller connector 60 to the steering device, the base portion 35*a* of the elastic member 35 separated from the electrical lead-through section 18 is disposed directly between the pair of spoke members 23 of the steering device.

The operation of the steering device of the second embodiment is about the same as that of the steering device of the first embodiment, and therefore will not be described.

In the second embodiment described above, the triangular post as a fixing post is formed on the movable housing. It should be understood, however, that the fixing post is not limited to the triangular post and may be a cylindrical or prismatic fixing post which allows the provision of the elastic member.

Furthermore, in the second embodiment described above, the elastic member 35 is disposed in the vicinity of the electrical lead-through section 18 through slight gap portion 33. It should be understood, however, that the roller connector is not limited thereto and may be a roller connector of such a configuration that the elastic member 35 directly held between the pair of spoke members 23 is removed by a considerable distance from the electrical lead-through section 18. Since it is sufficient if the elastic member 35 is located directly between the spoke members 23 as stated above, the degree of design freedom increases for mounting the movable housing of the roller connector with respect to the arrangement of each spoke member.

Next, by referring to the accompanying drawing, the third embodiment of the electrical lead-through section and the elastic member of the roller connector according to the present invention will be explained.

Figure 12:
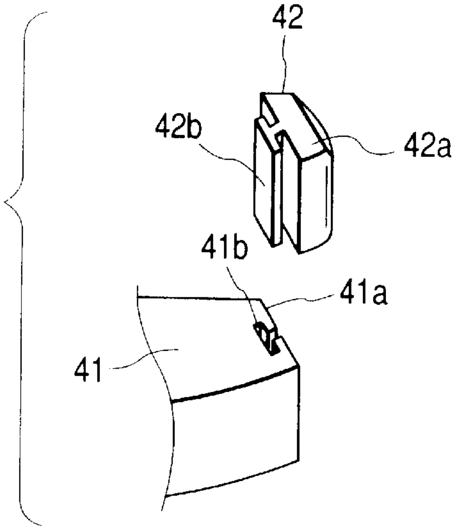
FIG. 12 is a perspective view showing major portions of the electrical lead-through section and the elastic member of the roller connector according to a third embodiment of the present invention.

FIG. 12 is a perspective view of a major portion showing the third embodiment of the electrical lead-through section and the elastic member of the roller connector according to the present invention.

Described below are differences in the configuration of the roller connector of the third embodiment from that of the first embodiment.

As shown in FIG. 12, a T-groove 41*b* is formed, vertically to the upper wall 6, in the entire surface of a third side wall 41*a* of an electrical lead-through section 41.

Also projectingly formed on the flat surface side of the semi-cylindrical base portion 42*a* of the elastic member 42 is a T-shaped key portion 42*b*.

The T-shaped key portion 42*b* of the elastic member 42 is inserted into the T-shaped groove portion 41*b*, thereby directly locking the elastic member 42 to the electrical lead-through section 41.

Next, by referring to the accompanying drawing, the fourth embodiment of the electrical lead-through section and the elastic member of the roller connector according to the present invention will be described.

Figure 13:
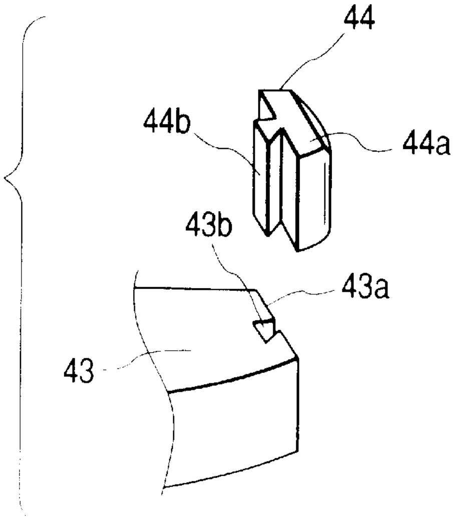
FIG. 13 is a perspective view showing major portions of the electrical lead-through section and the elastic member of the roller connector according to a third embodiment of the present invention.
Figure 14:
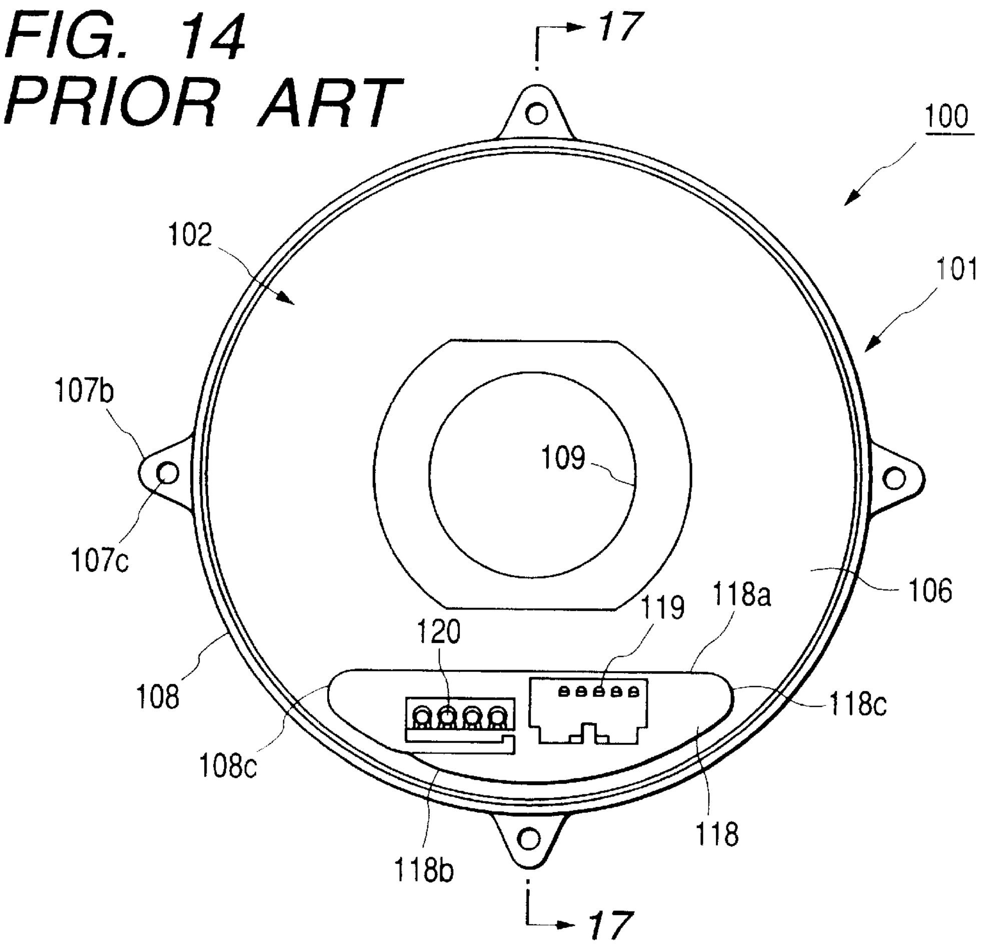
FIG. 14 PRIOR ART
FIG. 14 is a plan view showing a conventional roller connector.
Figure 15:
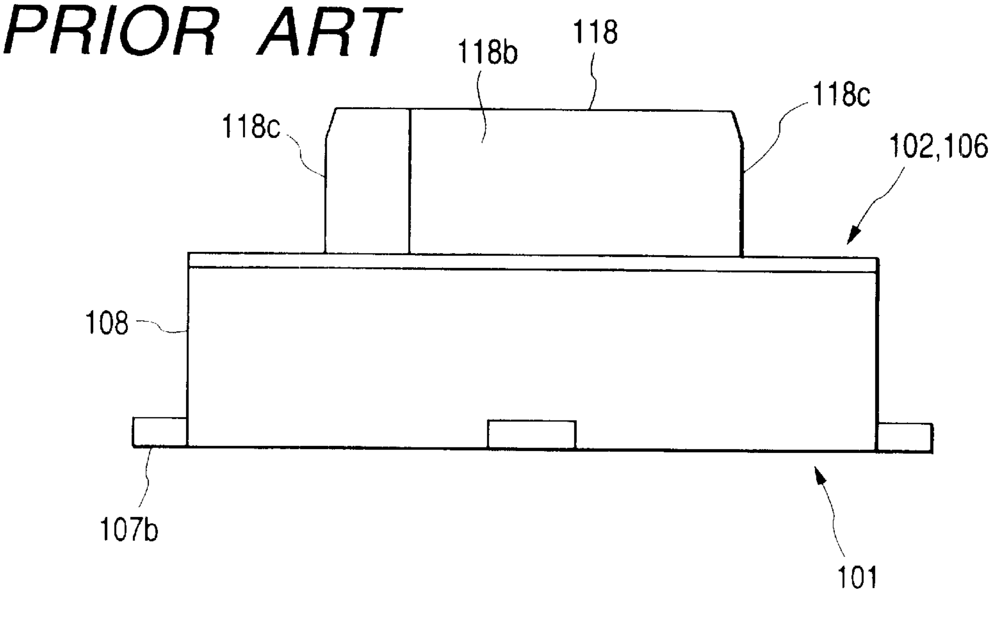
FIG. 15 PRIOR ART
FIG. 15 is a side view showing the conventional roller connector.
Figure 16:
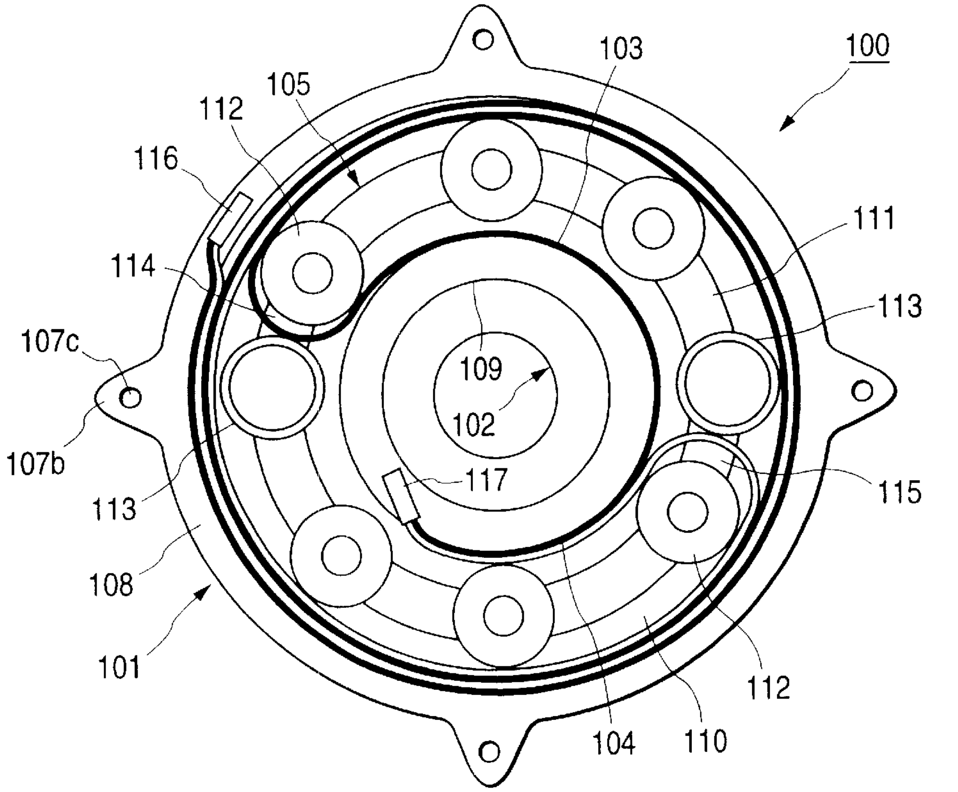
FIG. 16 PRIOR ART
FIG. 16 is a plan view for explaining the conventional roller connector.
Figure 17:
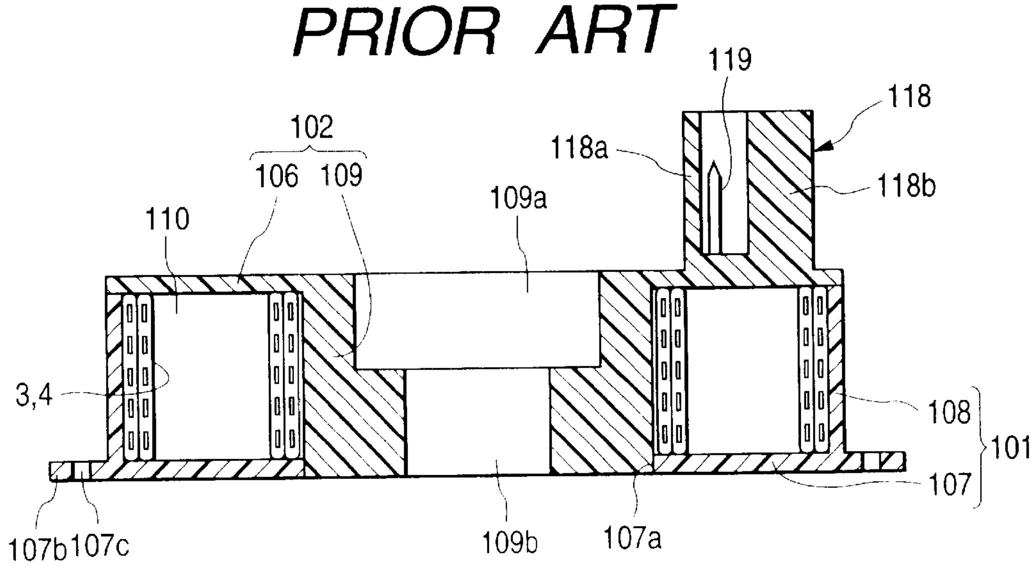
FIG. 17 PRIOR ART
FIG. 17 is a sectional view taken along line 17—17 of FIG. 14.
Figure 18:
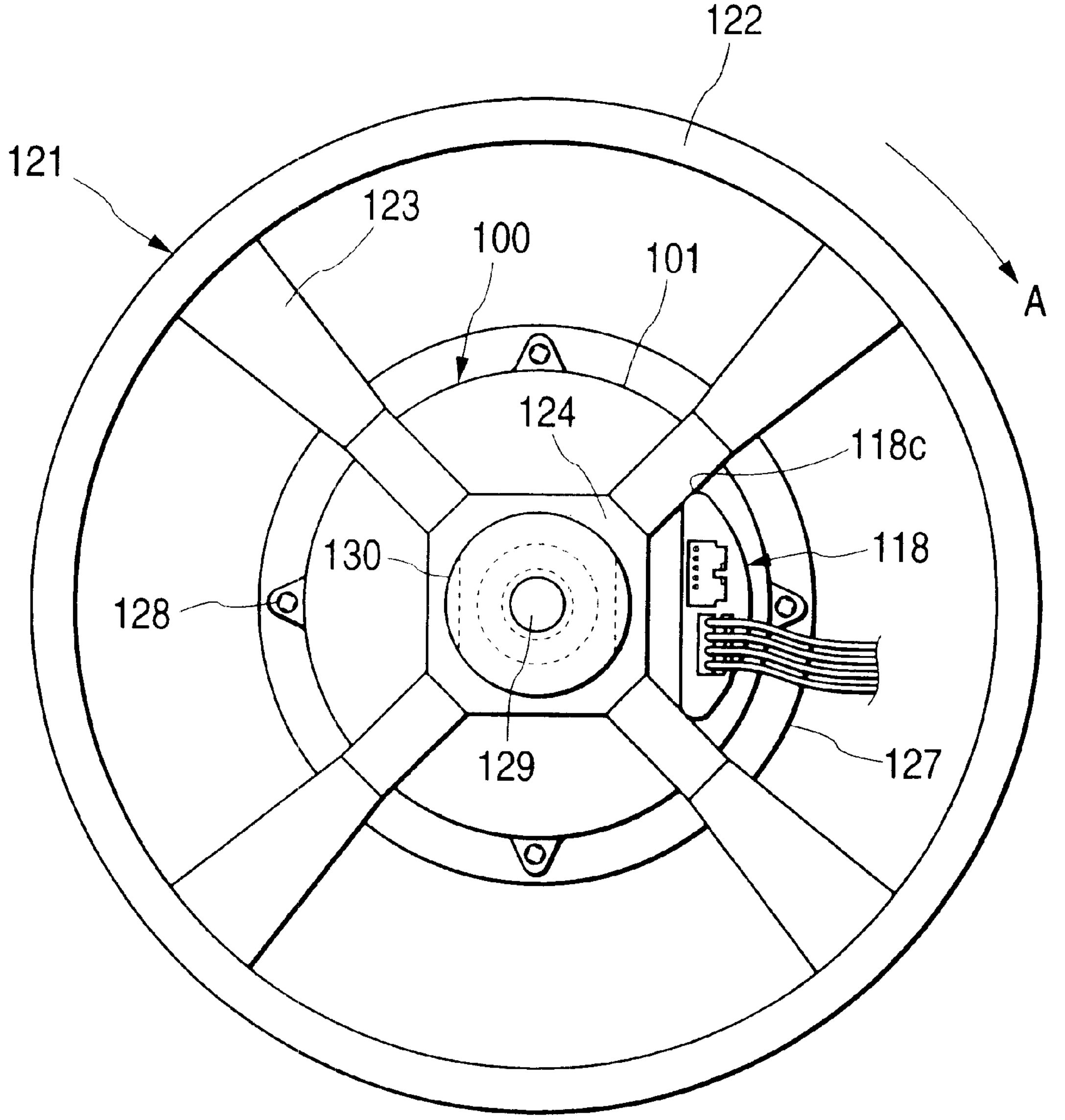
FIG. 18 PRIOR ART
FIG. 18 is a plan view for explaining the mounting of the conventional roller connector to a steering device.

FIG. 13 is a perspective view of a major portion showing the fourth embodiment of the electrical lead-through section and the elastic member of the roller connector according to the present invention.

Described below are differences in the configuration of the roller connector of the fourth embodiment from that of the first embodiment.

As shown in FIG. 13, an approximately trapezoidal groove portion 43*b* is formed, vertically to the upper wall 6, in the entire surface of a third side wall 43*a* of an electrical lead-through section 43.

Also projectingly formed on the flat surface side of the semi-cylindrical base portion 44*a* of the elastic member 44 is an approximately trapezoidal key portion 44*b*.

The approximately trapezoidal key portion 44*b* of the elastic member 44 is inserted into the approximately trapezoidal groove portion 43*b*, thereby directly locking the elastic member 44 to the electrical lead-through section 43.

In the third and fourth embodiments, it is unnecessary to provide the post 6*a* (shown in FIG. 3) as a fixing post.

In the roller connector of the present invention, as described above, at least one end of the flexible cable is connected to the electrical lead-through section of the movable housing, and the elastic member is disposed adjacently to the electrical lead-through section of the upper wall, so that the movable housing may be turned by applying a driving force to the elastic member. Therefore, if the spoke member made of a metallic material knocks against the elastic member, a knocking sound is absorbed by the elastic member. That is, the present invention has the advantage to provide the roller connector which will produce no knocking sound.

The roller connector of the present invention is provided on the upper wall with the fixing posts for locking the elastic member, to thereby reliably securing the elastic member.

In the roller connector of the present invention, the elastic member is locked on the side wall of the electrical lead-through section; the present invention therefore can provide a low-cost roller connector which allows the collection of the elastic member to the electrical lead-through section by a simple configuration.

Furthermore, in the roller connector of the present invention, fixing posts are formed on the upper wall adjacently to the electrical lead-through section; and the elastic member, being locked on the fixing posts and the electrical lead-through section, can be securely held by the two members in a stabilized status for a long period of time.

Furthermore, in the roller connector of the present invention, a plurality of fixing posts are formed on the upper wall to thereby lock the elastic member. That is, the elastic member is further securely held by a couple of fixing members.

Furthermore, in the roller connector of the present invention, the elastic member is driven by the spoke members of the steering wheel member; because a conventional spoke member is usable, therefore, it is possible to provide a low-cost steering device which uses the roller connector driven by the steering wheel member, without separately forming an elastic member driving member on the steering wheel member.

What is claimed is:

1. A roller connector mounted on a steering device, comprising: a fixed housing, a movable housing having an upper wall and an electrical lead-through section projecting out of the upper wall and rotatably mounted in the fixed housing, and a flexible cable housed in a space formed between the fixed housing and the movable housing; the flexible cable being connected at least at one end to the electrical lead-through section of the movable housing, and at the other end to the fixed housing; and disposed adjacently to the electrical lead-through section of the upper wall is an elastic member, to thereby turn the movable housing by applying a driving force to the elastic member, wherein a fixing post is projectingly formed on the upper wall, to thereby secure the elastic member.

2. A roller connector mounted on a steering device according to claim 1, wherein the elastic member is driven by a spoke member of a steering wheel member.

3. A roller connector mounted on a steering device according to claim 1, wherein the elastic member comprises a base portion having a through hole for inserting the fixing post therethrough.

4. A roller connector mounted on a steering device according to claim 3, wherein the elastic member is driven by a spoke member of a steering wheel member.

5. A roller connector mounted on a steering device according to claim 1, wherein another post projects from the upper wall and is separated from the electrical lead-through section by a slight gap portion, the other post has a groove portion in a section thereof at a side opposite to a side opposing the electrical lead-through section, and the elastic member comprises a base portion having a key portion for inserting into the groove portion of the other post.

6. A roller connector mounted on a steering device according to claim 5, wherein the fixing post projects from the upper wall in a vicinity of the other post, and the base portion of the elastic member has a through hole for inserting the fixing post therethrough.

7. A roller connector mounted on a steering device according to claim 6, wherein the elastic member is driven by a spoke member of a steering wheel member.

8. A roller connector mounted on a steering device, comprising: a fixed housing, a movable housing having an upper wall and an electrical lead-through section projecting out of the upper wall and rotatably mounted in the fixed housing, and a flexible cable housed in a space formed between the fixed housing and the movable housing; the flexible cable being connected at least at one end to the electrical lead-through section of the movable housing, and at the other end to the fixed housing; and disposed adjacently to the electrical lead-through section of the upper wall is an elastic member, to thereby turn the movable housing by applying a driving force to the elastic member, wherein the elastic member is secured on a side wall of the electrical lead-through section.

9. A roller connector mounted on a steering device according to claim 8, wherein the elastic member is driven by a spoke member of a steering wheel member.

10. A roller connector mounted on a steering device according to claim 8, wherein the elastic member comprises a base portion that has a key portion and a side wall of the electrical lead-through section has a groove portion that engages the key portion.

11. A roller connector mounted on a steering device according to claim 10, wherein the base portion has a semi-cylindrical shape, the key portion project outwardly from a flat surface side of the base portion, and a taper portion is formed on one end portion of a curved surface side of the base portion.

12. A roller connector mounted on a steering device according to claim 11, wherein the elastic member is driven by a spoke member of a steering wheel member.

13. A roller connector mounted on a steering device according to claim 8, wherein on the upper wall is formed a fixing post adjacently to the electrical lead-through section; and the elastic member is secured to the fixing post and the electrical lead-through section.

14. A roller connector mounted on a steering device according to claim 13, wherein the elastic member is driven by a spoke member of a steering wheel member.

15. A roller connector mounted on a steering device according to claim 13, wherein the elastic member comprises a base portion having a through hole for inserting a fixing post therethrough, the elastic member comprises a key portion, and a side wall of the electrical lead-through section has a groove portion that engages the key portion.

16. A roller connector mounted on a steering device according to claim 15, wherein the base portion has a semi-cylindrical shape, the key portion project outwardly from a flat surface side of the base portion, and a taper portion is formed on one end portion of a curved surface side of the base portion.

17. A roller connector mounted on a steering device according to claim 15, wherein the elastic member is driven by a spoke member of a steering wheel member.

18. A roller connector mounted on a steering device, comprising: a fixed housing, a movable housing having an upper wall and an electrical lead-through section projecting out of the upper wall and rotatably mounted in the fixed housing, and a flexible cable housed in a space formed between the fixed housing and the movable housing; the flexible cable being connected at least at one end to the electrical lead-through section of the movable housing, and at the other end to the fixed housing; and disposed adjacently to the electrical lead-through section of the upper wall is an elastic member, to thereby turn the movable housing by applying a driving force to the elastic member, wherein on the upper wall is formed a fixing post adjacently to the electrical lead-through section; and the elastic member is secured to the fixing post and the electrical lead-through section.

19. A roller connector mounted on a steering device according to claim 18, wherein the elastic member is driven by a spoke member of a steering wheel member.

* * * * *